(12) United States Patent
Ishii et al.

(10) Patent No.: US 9,611,891 B2
(45) Date of Patent: Apr. 4, 2017

(54) ROLLING BEARING

(71) Applicant: JTEKT CORPORATION, Osaka-shi, Osaka (JP)

(72) Inventors: Yasuhiko Ishii, Kashiwara (JP); Takashi Iwata, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/820,125

(22) Filed: Aug. 6, 2015

(65) Prior Publication Data

US 2016/0053810 A1 Feb. 25, 2016

(30) Foreign Application Priority Data

Aug. 22, 2014 (JP) .................. 2014-169850

(51) Int. Cl.
| | |
|---|---|
| F16C 33/38 | (2006.01) |
| F16C 33/66 | (2006.01) |
| F16C 19/16 | (2006.01) |
| F16C 33/78 | (2006.01) |
| F16C 33/80 | (2006.01) |

(52) U.S. Cl.
CPC ........ *F16C 33/6614* (2013.01); *F16C 19/163* (2013.01); *F16C 19/166* (2013.01); *F16C 33/3806* (2013.01); *F16C 33/6629* (2013.01); *F16C 33/7856* (2013.01); *F16C 33/80* (2013.01); *F16C 2240/46* (2013.01)

(58) Field of Classification Search
CPC . F16C 33/6614; F16C 19/166; F16C 33/7856
See application file for complete search history.

(56) References Cited

U.S. PATENT DOCUMENTS

| | | | | |
|---|---|---|---|---|
| 3,161,448 A | * | 12/1964 | Moran ................ | F16C 33/6614 384/462 |
| 3,674,356 A | * | 7/1972 | Zeneski .............. | F16C 33/6614 384/470 |
| 4,557,612 A | * | 12/1985 | Neal ..................... | F16C 33/782 277/423 |
| 8,523,449 B2 | * | 9/2013 | Hamada .............. | F16C 33/3856 384/470 |

FOREIGN PATENT DOCUMENTS

| | | | | |
|---|---|---|---|---|
| JP | KR 20060116694 A | * | 11/2006 | ............ F16C 19/163 |
| JP | 2010-164122 A | | 7/2010 | |

* cited by examiner

*Primary Examiner* — Thomas R. Hannon
(74) *Attorney, Agent, or Firm* — Oliff PLC

(57) ABSTRACT

A rolling bearing includes an outer ring, an inner ring in which a shoulder diameter at one end of the rolling bearing in an axial direction is different from a shoulder diameter at the other end of the rolling bearing in the axial direction, a cage, a plurality of rolling elements, and shielding portions. A first clearance between an outer ring inner peripheral surface facing a large end of the inner ring having the larger shoulder diameter and a cage outer peripheral surface facing the outer ring inner peripheral surface is larger than a second clearance between an outer ring inner peripheral surface facing a small end of the inner ring having the smaller shoulder diameter and a cage outer peripheral surface facing the outer ring inner peripheral surface.

2 Claims, 5 Drawing Sheets

ROLLING BEARING

INCORPORATION BY REFERENCE

The disclosure of Japanese Patent Application No. 2014-169850 filed on Aug. 22, 2014 including the specification, drawings and abstract, is incorporated herein by reference in its entirety.

BACKGROUND OF THE INVENTION

1. Field of the Invention

The present invention relates to a rolling bearing.

2. Description of Related Art

An angular contact ball bearing is known as a bearing that supports rotating shafts of various mechanical apparatuses. In recent years, the rotating shaft of such a mechanical apparatus is often rotated at high speed in order to improve machining efficiency and operational efficiency. Thus, high reliability of the angular contact ball bearing has been demanded; for example, the angular contact ball bearing needs to be protected from seizure at high rotation speed. In an increasing number of cases, grease lubrication, which exhibits high lubrication performance, has been adopted instead of oil lubrication in which a lubricant is supplied to the inside of a bearing, in order to improve the reliability of the angular contact ball bearing. In the grease lubrication, the grease is pre-contained inside the bearing.

The grease contained inside the bearing needs to be supplied to portions that need lubrication during operation of the bearing. Thus, various proposals have been made to improve the flowability of the grease inside the bearing (see, for example, Japanese Patent Application Publication No. 2010-164122 (JP 2010-164122 A)).

In an angular contact ball bearing 30 described in JP 2010-164122 A, an inner ring 31 has an angular shape as depicted in FIG. 5. That is, with reference to an axial direction (lateral direction in FIG. 5), a right shoulder diameter and a left shoulder diameter are different from each other. Specifically, in FIG. 5, the shoulder diameter of a right area 32 of the inner ring 31 is larger than the shoulder diameter of a left area 33 of the inner ring 31. A circular arc surface joining the areas 32 and 33 together defines an inner ring raceway groove 34.

In the angular contact ball bearing 30, an outer ring 35 has a deep groove shape, as depicted in FIG. 5. That is, with reference to the axial direction, the right and left shoulder diameters are the same. Specifically, in FIG. 5, the shoulder diameter of a right area 36 of an outer ring 35 is substantially the same as the shoulder diameter of a left area 37 of the outer ring 35.

Grease storage grooves 39a and 39b leading to a raceway groove 38 of the outer ring 35 are formed in an inner peripheral portion of the outer ring 35. The grease storage grooves 39a and 39b are each formed outside the raceway groove 38 in the axial direction. In FIG. 5, a grease guide surface 40 inclined inward in the axial direction and outward in a radial direction is formed in a groove wall of the grease storage groove 39b, located on the right in FIG. 5.

In the angular contact ball bearing described in JP 2010-164122 A, grease collected in the grease storage groove 39b during operation is pressed against the grease guide surface 40 by a wind pressure caused by rotation of a cage 42 resulting from rolling of a ball 41. The grease pressed against the grease guide surface 40 is stably fed to the raceway groove 38 of the outer ring 35 along the inclined grease guide surface 40.

However, for example, the inner ring 31 has the angular shape and a pump effect is exerted in which the ball 41 spins during operation, and thus, the grease is disadvantageously likely to concentrate at one side (on the right in FIG. 5). The grease concentrated at the one side may be retained in place or may even leak to the exterior through a labyrinth at a leading end of a noncontact seal 43. The retention or leakage of the grease leads to inappropriate lubrication, resulting in defects such as seizure, temperature elevation, or wear.

SUMMARY OF THE INVENTION

An object of the present invention is to provide a rolling bearing that allows circularity of grease inside a bearing to be improved.

A rolling bearing according to an aspect of the present invention includes an outer ring, an inner ring in which a shoulder diameter at one end of the rolling bearing in an axial direction is different from a shoulder diameter at the other end of the rolling bearing in the axial direction, a cage, a plurality of rolling elements arranged so as to be held by the cage in an annular space between the outer ring and the inner ring at predetermined intervals along a circumferential direction, and shielding portions arranged at both ends of the annular space in the axial direction to suppress leakage of the grease to an exterior. A first clearance between an outer ring inner peripheral surface facing a large end of the inner ring having the larger shoulder diameter and a cage outer peripheral surface facing the outer ring inner peripheral surface is larger than a second clearance between an outer ring inner peripheral surface facing a small end of the inner ring having the smaller shoulder diameter and a cage outer peripheral surface facing the outer ring inner peripheral surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of a rolling bearing according to the present invention will be described with reference to the attached drawings.

Figure 1:
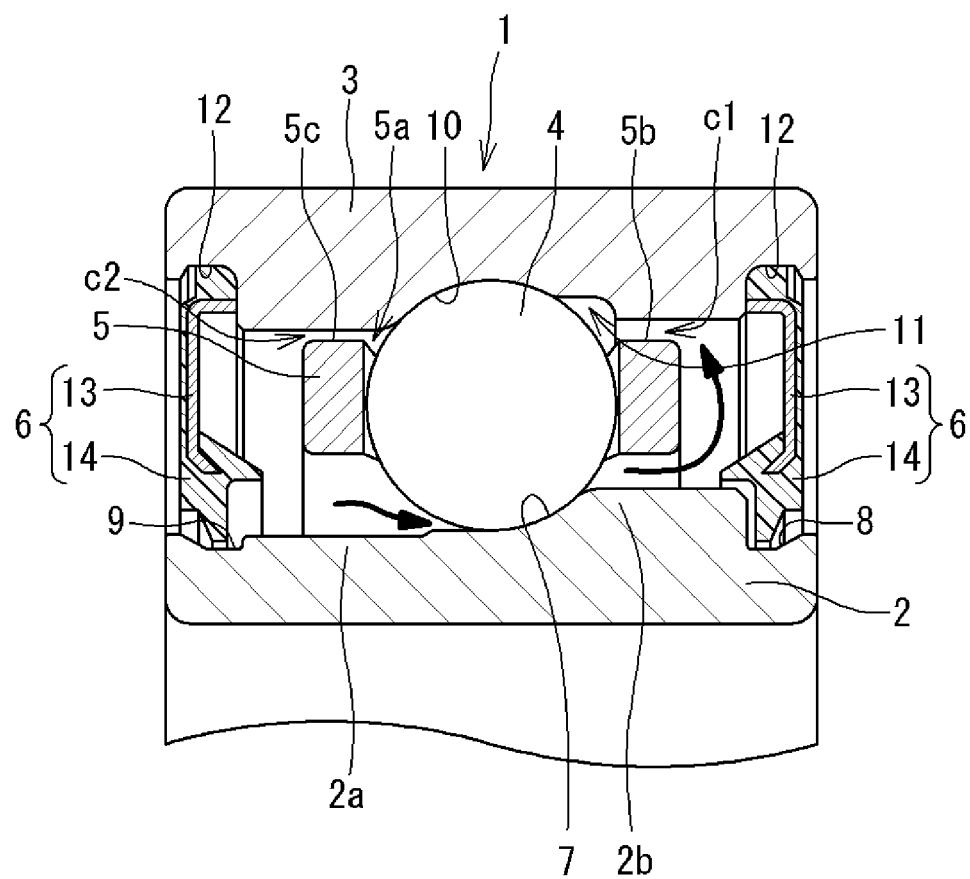
FIG. 1 is a partial sectional view illustrating a first embodiment of a rolling bearing of the present invention.

FIG. 1 is a partial sectional view of a rolling bearing according to a first embodiment of the present invention. A rolling bearing 1 according to the first embodiment includes an inner ring 2, an outer ring 3, balls 4 that are a plurality of rolling elements, a cage 5, and seal portions 6 serving as shielding portions.

The inner ring 2 has an angular shape. A raceway groove 7 is formed in an outer peripheral portion of the inner ring 2 such that a contact angle between the inner ring 2 and the ball 4 has a predetermined value. The inner ring 2 has an inner ring small end 2a and an inner ring large end 2b. The inner ring small end 2a is positioned at one end of the inner ring 2 in an axial direction across the raceway groove 7 (on the left in FIG. 1). The inner ring large end 2b is positioned at the other end of the inner ring 2 in the axial direction across the raceway groove 7 (on the right in FIG. 1). The inner ring small end 2a and the inner ring large end 2b have different shoulder diameters. Specifically, the shoulder diameter of the inner ring small end 2a is smaller than the shoulder diameter of the inner ring large end 2b. An annular groove portion 8 is formed at an end of the inner ring large end 2b away from the raceway groove 7. A groove portion 9 shallower than the groove portion 8 is also formed at an end of the inner ring small end 2a away from the raceway groove 7.

In an inner peripheral portion of the outer ring 3, a raceway groove 10 is formed at such a position as to face the raceway groove 7 of the inner ring 2. The balls 4 are disposed between the raceway groove 7 of the inner ring 2 and the raceway groove 10 of the outer ring 3 so as to be rollable. An annular grease storage groove 11 leading to the raceway groove 10 is formed in the inner peripheral portion of the outer ring 3. The grease storage groove 11 is formed in an outer ring inner peripheral portion facing the inner ring large end 2b. Seal grooves 12 in which seal portions 6 are fixed are formed at both ends of the inner peripheral portion of the outer ring 3.

The balls 4 are disposed between the raceway grooves 7 and 10 while held by the cage 5 so as to be arranged at predetermined intervals along a circumferential direction. The cage 5 is formed of a strip material and has a ring shape. The strip material is provided, along its circumferential direction, with pockets 5a for supporting the balls 4. The cage 5 in the first embodiment is a cage guided by the outer ring.

In the first embodiment, the seal portions 6 are provided at both ends, in the axial direction, of an annular space between the inner ring 2 and the outer ring 3 to serve as a shielding portion that suppresses leakage of grease in the annular space to the exterior. The seal portion 6 includes an annular core 13 and a seal element 14 attached to the core 13. An outer peripheral portion of the seal portion 6 is fixed to the seal groove 12 formed in the outer ring 3. On the other hand, a slight clearance is formed between an inner peripheral end of the seal portion 6, that is, an inner peripheral end of the seal element 14, and a groove bottom of the groove portion 8 or the groove portion 9. Thus, a labyrinth seal is formed between the inner peripheral end of the seal element 14 and the groove bottom of the groove portion 8 or 9.

In the first embodiment, the inner peripheral portion of the outer ring 3 is formed such that the bore diameter of the inner peripheral portion of the outer ring 3, which faces the inner ring small end 2a is smaller than the bore diameter of the inner peripheral portion of the outer ring 3, which faces the inner ring large end 2b. Thus, a clearance c1 (first clearance) between an inner peripheral surface of the outer ring 3, which faces the inner ring large end 2b and an outer peripheral surface 5b of the cage 5 is larger than a clearance c2 (second clearance) between an inner peripheral surface of the outer ring 3, which faces the inner ring small end 2a and an outer peripheral surface 5c of the cage 5. The sizes of the clearance c1 and the clearance c2 are not particularly limited in the present invention, but may be set such that, for example, c1=0.2 to 0.5 mm and c2=0.1 to 0.3 mm. The difference between the clearance c1 and the clearance c2 may be, for example, 0.1 to 0.4 mm.

Figure 2:
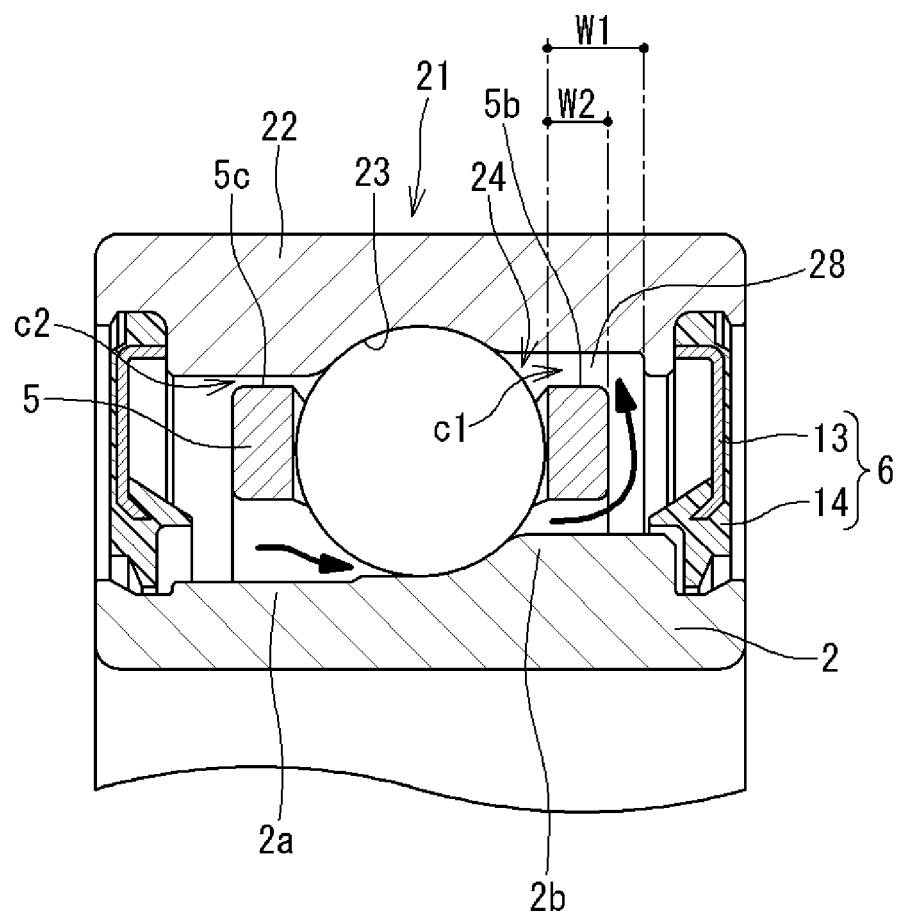
FIG. 2 is a partial sectional view illustrating a second embodiment of the rolling bearing of the present invention.

FIG. 2 is a partial sectional view illustrating a rolling bearing according to a second embodiment of the present invention. A rolling bearing 21 depicted in FIG. 2 is different from the rolling bearing 1 depicted in FIG. 1 in that a grease storage groove 24 leading to a raceway groove 23 of an outer ring 22 is extended toward the outside in the axial direction and in that the first clearance is larger than the second clearance. The remaining part of the configuration is the same as the corresponding part of the configuration of the rolling bearing 1 according to the first embodiment. Thus, common components are denoted by the same reference numerals and will not be described below for simplification.

In the second embodiment, the grease storage groove 24 that leads to the raceway groove 23 and that is formed in the inner peripheral portion of the outer ring 22 extends toward the outside in the axial direction. A groove-shaped grease reservoir 28 extending along the circumferential direction is formed in an outer ring inner peripheral surface facing the inner ring large end 2b of the inner ring 2 having the larger shoulder diameter. The width w1 of the grease reservoir 28 corresponding to the extension of the grease storage groove 24 is larger than the width w2 of the cage 5 facing the grease reservoir 28. Consequently, the clearance c1 (first clearance) between an inner peripheral surface of the outer ring 22, which faces the inner ring large end 2b and the outer peripheral surface 5b of the cage 5 is larger than the clearance c2 (second clearance) between an inner peripheral surface of the outer ring 22, which faces the inner ring small end 2a and the outer peripheral surface 5c of the cage 5.

In the rolling bearings according to the first and second embodiments, the grease is likely to concentrate in a certain area due to the above-described pump effect or the like while the bearing is in operation, and the clearance between the cage 5 and the outer ring inner peripheral surface (clearance c1) in this area is larger than the second clearance on the opposite side of the balls 4 from the area. Thus, the grease concentrated in the area flows through the first clearance c1 to the raceway groove of the outer ring and can circulate more easily than that in the related art as depicted by arrows in FIG. 1 and FIG. 2. Therefore, lubricity of the raceway groove can be improved to prevent possible defects such as seizure, temperature elevation, or wear resulting from inappropriate lubrication.

Figure 3:
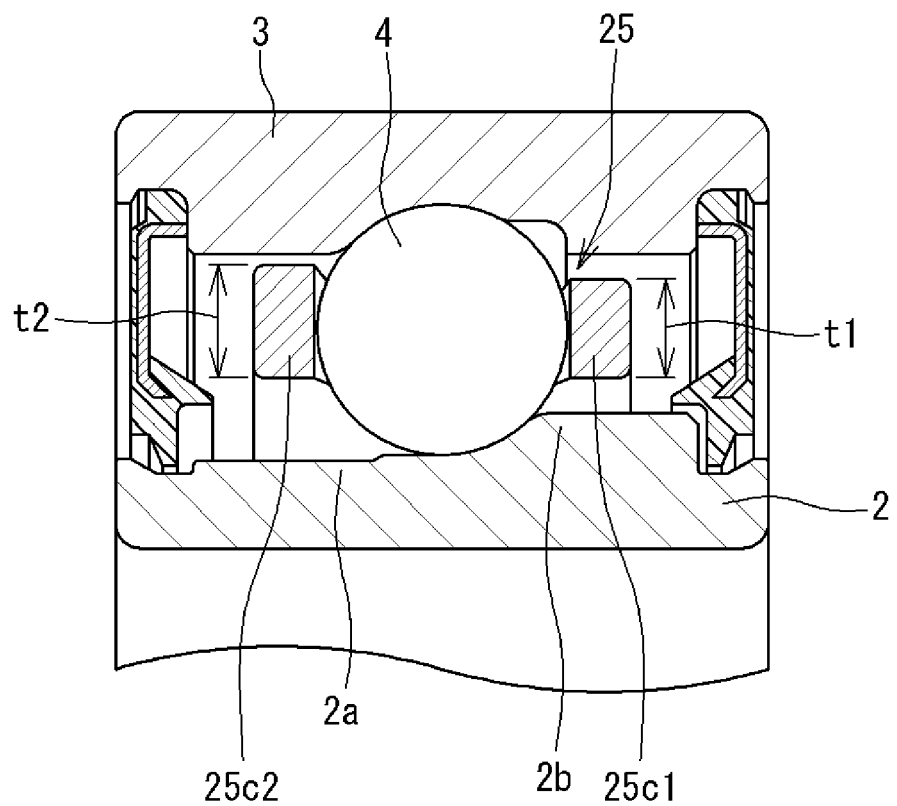
FIG. 3 is a partial sectional view illustrating a third embodiment of the rolling bearing of the present invention.

The present invention is not limited to the above-described first and second embodiments, and various changes may be made to the embodiments. For example, in the above-described embodiments, the first clearance is set larger than the second clearance by adjusting the size of the inner peripheral portion of the outer ring. However, in a third embodiment, the first clearance may be set larger than the second clearance, as depicted in FIG. 3, by making the sectional shapes of a right rim portion 25c1 and a left rim portion 25c2 (right and left in FIG. 3) of a cage 25 different from each other. Specifically, the first clearance may be set larger than the second clearance by setting the radial dimension t1 of the rim portion 25c1 facing the inner ring large end 2b smaller than the radial dimension t2 of the rim portion 25c2 facing the inner ring small end 2a. In other words, the first clearance may be set larger than the second clearance by setting the diameter of the cage outer peripheral surface facing the inner ring large end 2b smaller than the diameter of the cage outer peripheral surface facing the inner ring small end 2a.

Figure 4A:
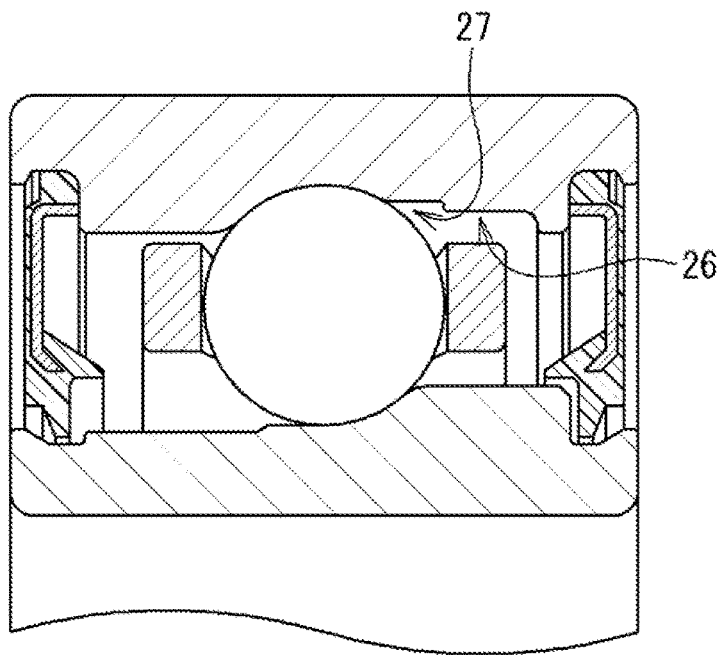
FIG. 4A is a partial sectional view illustrating a fourth embodiment of the rolling bearing of the present invention and FIG. 4B is a partial sectional view illustrating a fifth embodiment of the rolling bearing of the present invention.
Figure 4B:
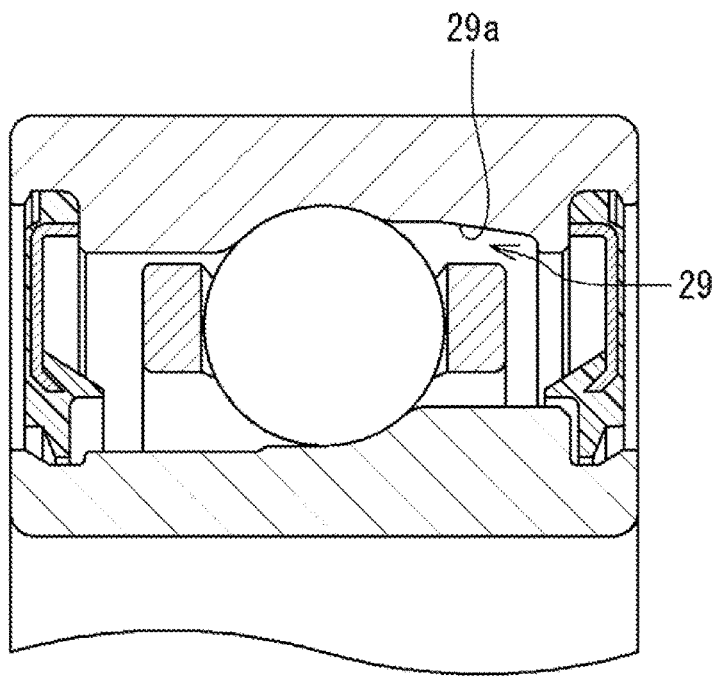
Figure 5:
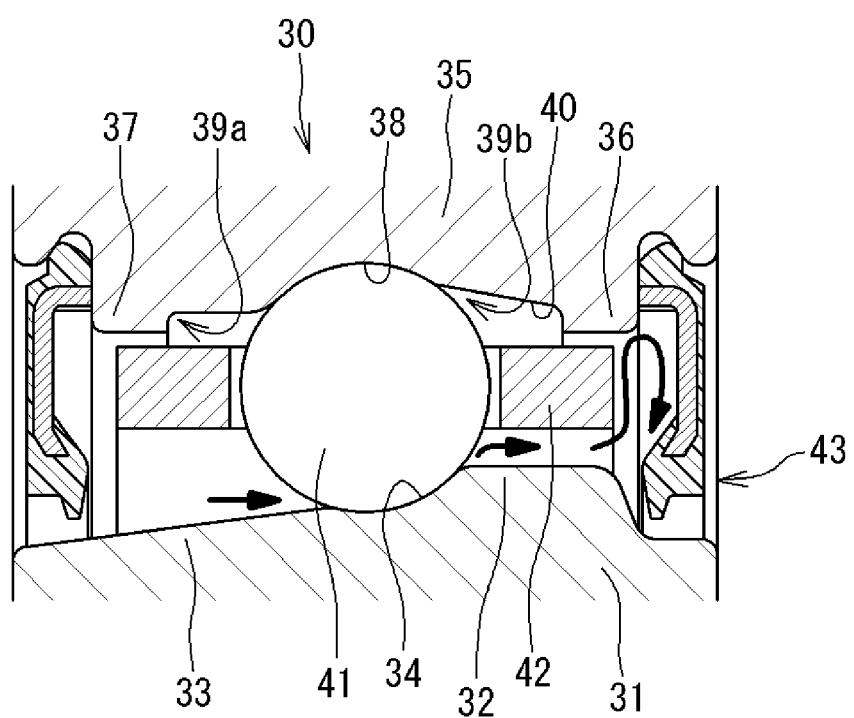
FIG. 5 is a partial sectional view illustrating an example of a conventional angular contact ball bearing.

In the above-described second embodiment, the groove bottoms of the grease storage groove and the grease reservoir are parallel to the axial direction of the bearing and are flat. However, a grease reservoir 26 may be shallower than a grease storage groove 27 and may be stepped, in a fourth embodiment, for example, as depicted in FIG. 4A. Alternatively, a grease reservoir 29 with an inclined groove bottom 29a may be used in a fifth embodiment as depicted in FIG. 4B.

The above-described first to fifth embodiments uses the cage guided by the outer ring. However, a cage guided by rolling elements may be used. Furthermore, the first to fifth embodiments use the seal portions including the core and the seal element attached to the core, as shielding portions that hinder leakage of the grease to the exterior of the bearing. However, a wall surface of a member other than the bearing, for example, a housing, may be used to close the ends of the annular space. In this case, the wall surface of the housing forms the shielding portion.

The rolling bearing of the present invention allows circularity of the grease inside the bearing.

What is claimed is:

1. A rolling bearing comprising:
an outer ring;
an inner ring in which a shoulder diameter at one end of the rolling bearing in an axial direction is different from a shoulder diameter at the other end of the rolling bearing in the axial direction;
a cage;
a plurality of rolling elements arranged so as to be held by the cage in an annular space between the outer ring and the inner ring at predetermined intervals along a circumferential direction, and
seal portions arranged at both ends of the annular space in the axial direction to suppress leakage of grease to an exterior, wherein
a first clearance between an outer ring inner peripheral surface facing a large end of the inner ring having a larger shoulder diameter and a cage outer peripheral surface facing the outer ring inner peripheral surface is larger than a second clearance between an outer ring inner peripheral surface facing a small end of the inner ring having a smaller shoulder diameter and a cage outer peripheral surface facing the outer ring inner peripheral surface,
a third clearance is formed between an inner peripheral end of one of the seal portions and a groove bottom of a groove, the groove being formed at an end of the large end of the inner ring or at an end of the small end of the inner ring, the groove bottom facing the inner peripheral end of one of the seal portions, and
a diameter of a cage outer peripheral surface defining the first clearance is smaller than a diameter of a cage outer peripheral surface defining the second clearance.

2. A rolling bearing comprising:
an outer ring;
an inner ring in which a shoulder diameter at one end of the rolling bearing in an axial direction is different from a shoulder diameter at the other end of the rolling bearing in the axial direction;
a cage;
a plurality of rolling elements arranged so as to be held by the cage in an annular space between the outer ring and the inner ring at predetermined intervals along a circumferential direction, and
seal portions arranged at both ends of the annular space in the axial direction to suppress leakage of grease to an exterior, wherein
a first clearance between an outer ring inner peripheral surface facing a large end of the inner ring having a larger shoulder diameter and a cage outer peripheral surface facing the outer ring inner peripheral surface is larger than a second clearance between an outer ring inner peripheral surface facing a small end of the inner ring having a smaller shoulder diameter and a cage outer peripheral surface facing the outer ring inner peripheral surface, and
a grease storage groove that leads to a raceway groove and that is formed in an inner peripheral portion of the outer ring extends toward an outside in the axial direction, a groove-shaped grease reservoir extending along the circumferential direction is formed in the outer ring inner peripheral surface facing the large end of the inner ring having the larger shoulder diameter, and a width of a groove bottom of the grease reservoir is larger than a width of the cage facing the grease reservoir.

* * * * *